US007563739B2

(12) United States Patent
Kilthau et al.

(10) Patent No.: US 7,563,739 B2
(45) Date of Patent: Jul. 21, 2009

(54) DESICCANT BASED ON CLAY-BOUND ZEOLITE, PROCESS FOR ITS PREPARATION AND ITS USE

(75) Inventors: Fritz Kilthau, Zwingenberg (DE); Thomas E. W. Niessen, Westhofen (DE); Heide Wetzel, Worms (DE)

(73) Assignee: Grace GmbH & Co. KG., In der Hollerhecke l (DE)

( * ) Notice: Subject to any disclaimer, the term of this patent is extended or adjusted under 35 U.S.C. 154(b) by 348 days.

(21) Appl. No.: 10/487,508

(22) PCT Filed: Aug. 20, 2002

(86) PCT No.: PCT/EP02/09277

§ 371 (c)(1),
(2), (4) Date: Dec. 20, 2004

(87) PCT Pub. No.: WO03/018175

PCT Pub. Date: Mar. 6, 2003

(65) Prior Publication Data

US 2005/0107243 A1    May 19, 2005

(30) Foreign Application Priority Data

Aug. 22, 2001    (DE) ............................... 101 41 020

(51) Int. Cl.
*B01J 29/06*    (2006.01)
(52) U.S. Cl. ............................ 502/64; 502/68; 502/69; 502/400; 502/407; 502/414

(58) Field of Classification Search ................ 502/400, 502/407, 414, 64, 68, 69
See application file for complete search history.

(56) References Cited

U.S. PATENT DOCUMENTS

| 3,625,866 | A |   | 12/1971 | Conde |
|---|---|---|---|---|
| 4,476,169 | A | * | 10/1984 | Nishino et al. ................ 428/34 |
| 5,026,531 | A | * | 6/1991 | Tannous et al. ............. 423/712 |
| 5,300,138 | A | * | 4/1994 | Fischer et al. ................. 96/125 |
| 5,332,538 | A | * | 7/1994 | Levinson et al. ............ 264/492 |
| 5,493,821 | A |   | 2/1996 | Cohen et al. ................ 52/171.3 |
| 5,879,764 | A | * | 3/1999 | Chu et al. ..................... 428/34 |

FOREIGN PATENT DOCUMENTS

| DE | 17 92 743 | 12/1972 |
|---|---|---|
| DE | 37 11 156 | 10/1988 |
| FR | 1 463 443 | 3/1967 |
| JP | 62 027037 | 2/1987 |
| JP | 02144121 | 6/1990 |

* cited by examiner

*Primary Examiner*—Elizabeth D Wood
(74) *Attorney, Agent, or Firm*—William D. Bunch

(57) ABSTRACT

The invention relates to a desiccant based on clay-bound zeolite which is characterized in that it comprises hygroscopic salt and optionally further conventional additives. Preferably, it is present in the form of granules, the hygroscopic salt being arranged in the pores of the granular particles. Furthermore the invention relates to a process for the preparation of the desiccant as well as its use, in particular in insulating glass windows and spacers for insulating glass windows.

23 Claims, No Drawings

DESICCANT BASED ON CLAY-BOUND ZEOLITE, PROCESS FOR ITS PREPARATION AND ITS USE

The present invention relates to a desiccant based on clay-bound zeolite, a process for its preparation, its use for the production of insulating glass windows, and also insulating glass windows and spacers for insulating glass windows which comprise the desiccant according to the invention.

In double windows (composite windows) and insulating windows with two or more panes, there are spacers between the glass panes (e.g. made of aluminium or aluminium alloys), into which cavities are usually incorporated as reservoir for a desiccant which is intended to prevent the accumulation of moisture in the space between the panes.

Molecular sieves (zeolites) and/or silica gel are widespread as desiccants for insulating glass windows, being used alone or in combination with active carbon, clay, porcelain materials and glass or mineral fibre fabrics.

Frequently used zeolites are molecular sieves of type 3 Å or combinations of the latter with silica gel or molecular sieves of type 10 Å. Molecular sieves of type 4 Å are normally no longer used despite their somewhat higher water-absorption capacity, as they can adsorb or desorb nitrogen (or air) or other filling gases which are located in the space between the panes, which leads to an increased distortion of the window when the ambient temperature changes. In extreme cases, the stress which such a distortion exerts on the glass pane and the sealing material can lead to a fracturing of the glass or an increased water diffusion through the sealing material, which is associated with a shorter life of the insulating window. To prevent this undesired behaviour, most of the previously used desiccants in the insulating glass sector are based on products with pore openings of 3 Å.

To use desiccants in the construction of insulating glass windows, their water-absorption capacity per volume is one of the most important quality parameters, as the water-absorption potential of the desiccant codetermines the adsorption capacity and thus the life of the insulating window. The bulk density (i.e. weight by volume of a bulk material) is likewise of great importance, as it is of decisive importance, for economic reasons, or for increasing the life of the window, to be able to house as large a quantity as possible of desiccant in the narrow cavities of a spacer.

With the presently used desiccants, water-absorption capacities typically in the range from 135 g $H_2O$/l desiccant to 145 g $H_1O$/2 desiccant can be reached. These are clay-bound potassium-containing zeolite of the structure type A, clay-bound sodium-containing zeolite of the structure type A or a water glass-bound sodium zeolite A with shrunken pores which can each be used alone or in combination with silica gel or a zeolite of the faujasite structure type. For the reasons already mentioned above of gas adsorption and desorption, clay-bound sodium zeolites 4 Å or pure sodium zeolites 4 Å are normally not used.

Typical examples of clay-bound potassium-containing zeolite of the structure type A are the products currently marketed by Grace Davison under the trade names Phonosorb® 551, 555 or 558, each of which contains approximately 80 to 85 wt.-% potassium zeolite 3 Å and 15 to 20 wt.-% clay as binder. The "wt.-%" value relates in the following in each case to the weight of the finished desiccant. After activation, such products have a bulk density of approximately 750 g/l and a water-absorption capacity (measured at 10% relative humidity, r.h., and 25° C.) of approximately 18.5 wt.-% (relative to the weight of the desiccant), which corresponds to a water-absorption capacity per volume of 139 g $H_2O$/l desiccant.

Examples of water-glass-bound sodium zeolites 4 Å with shrunken pores are the trade products MS W 551 and MS W 558 (Grace Davison), the latter previously being produced and marketed under the name MS 330 by Degussa-Hüls AG. These desiccants contain 85 to 90 wt.-% sodium zeolite A which is bound to 10 to 15 wt.-% sodium silicate, and have a bulk density of 700 g/l with a water-absorption capacity (measured at 10% r.h. and 25° C.) of 21 wt.-% (relative to the weight of the desiccant). This corresponds to a water-absorption capacity per volume of 147 g $H_2O$/l desiccant.

Although the previously mentioned products have a relatively satisfactory water-absorption potential, an improvement with regard to an increase in the bulk density is also of interest. Those skilled in the art are also familiar with zeolite desiccants with higher bulk densities, e.g. desiccants which are predominantly used in refrigerators. However their water adsorption would still have to be increased to reach the range of the water-absorption potential of standard products used in the insulating window industry. An example that may be cited of such highly compressed desiccants is the molecular sieve MS 594 (Grace Davison) which contains a clay-bound potassium zeolite 3 Å with a bulk density of 820 g/l and a relatively low water-absorption capacity (measured at 10% r.h. and 25° C.) of 17 wt.-% (relative to the weight of the desiccant), which corresponds to a water-absorption capacity per volume of 139 g $H_2O$/l desiccant.

The object of the present invention is therefore to provide a desiccant which does not display the above-mentioned disadvantages of the products described in the state of the art, and in particular has an improved water-absorption capacity with a simultaneously higher bulk density.

This object is achieved by the present invention in that it provides a desiccant based on clay-bound zeolite which is characterized in that it comprises hygroscopic salt and optionally further conventional additives.

Another object of the invention is a process for the preparation of the desiccant according to the invention.

A further object of the invention is the use of the desiccant according to the invention in insulating glass windows, composite windows, spacers for insulating glass windows or composite windows, packed in paper or plastic bags, in stoppers of tablet tubes or in gas dryers, in particular air dryers.

The invention relates finally to insulating glass windows or composite windows and spacers for insulating glass windows or composite windows which comprise the desiccant according to the invention.

Preferred embodiments are the subject-matter of the dependent claims.

The desiccant according to the invention comprises the components (a) zeolite, (b) clay, (c) hygroscopic salt and optionally as further component (d) conventional additives.

The desiccant according to the invention is present in customary particulate solid forms, say as granules, pellets or extrudate, provided the properties required for use as desiccant, e.g. bulking ability and water-absorption capacity, are ensured. Granules are readily-flowing particulate aggregates of powders which are composed of various shaped granular particles with sufficient mechanical strength, and have been prepared by aggregation or shaping of finer powder particles. Thus granular particles are more or less porous aggregates of powdery starting substances. Upon granule formation, as narrow a particle-size range as possible with a uniform geometric shape is sought, e.g. upon preparation of pellets which are spherical granular particles of very narrow particle-size range.

In a preferred embodiment, the desiccant according to the invention is present as granules. Preferably the hygroscopic salt/hygroscopic salts (component (c)) is/are arranged in the pores of the granular particles. The micropores of the zeolite (component (a)) are therefore preferably free from hygroscopic salt.

According to the invention, the desiccant can also consist merely of components (a), (b), (c) and optionally (d).

The proportions of the named components given in "wt.-%" refer in the overall description and the claims, if not otherwise indicated, to the weight of the total desiccant.

Any zeolites which are usually contained in desiccants can be used as component (a). Preferred are however sodium-containing zeolite of the structure type A, potassium-containing zeolite of the structure type A, zeolite of the faujasite structure type or any mixture of these zeolites. Particularly preferred is potassium-containing Zeolite of the structure type A which has a potassium content of 9 to 18 wt.-% (relative to the weight of the zeolite) and are typically prepared by the exchange of sodium-containing zeolite of the structure type A for potassium salt.

The desiccant according to the invention contains the zeolite (component (a)) preferably in an amount of 50 to 90 wt.-%, more preferably 70 to 90 wt.-% and in particular 75 to 85 wt.-%.

As component (b) the desiccant according to the invention comprises clay, the clays usually used in clay-bound zeolites being able to be used. These are for example montmorillonite, kaolinite, bentonite, smectite, attapulgite, sepiolite or any mixture thereof.

The desiccant according to the invention contains clay (component (b)) preferably in an amount of 5 to 40 wt.-%, more preferably 7 to 25 wt.% and in particular 10 to 20 wt.-%.

Furthermore, the desiccant according to the invention comprises hygroscopic salt (component (c)). By the term "hygroscopic" is meant here the property of diverse inorganic salts of attracting atmospheric moisture during prolonged storage in normal air which always contains some water vapour. Magnesium chloride, calcium chloride, magnesium sulphate, sodium sulphite, magnesium polyphosphate, sodium polyphosphate, sodium carbonate, sodium sulphate or any mixture of these salts is preferably used as component (c). The aforementioned magnesium salts are preferred, as they have only a limited ability to exchange potassium ions of potassium-containing zeolites of structure type A. Magnesium sulphate is the most preferred. The other salts can also be used in principle, but are less preferred as they can contribute to an increase in the pore width and thus to a greater tendency of the desiccant to adsorb and desorb air (or nitrogen) and other filling gases.

The desiccant according to the invention contains the hygroscopic salt (component (c)) preferably in an amount of 2 to 30 wt.-%, more preferably 2 to 15 wt.-% and in particular 5 to 10 wt.-%.

Optionally, the desiccant according to the invention comprises as component (d) further conventional additives, e.g. granulation auxiliaries. The amount of component (d) in the desiccant according to the invention is preferably 0 to 5 wt.-%.

The desiccant according to the invention is prepared by mixing a starting mixture comprising the components (a) zeolite, (b) clay, (c) hygroscopic salt and (d) optionally further conventional additives, aggregating it, and activating, optionally after drying and/or sieving, the product obtained through aggregation.

The starting mixture contains the already previously described zeolites, clays, hygroscopic salts and additives. Suitable amounts of these components are as follows:
- (a) 50 to 90 wt.-% (preferably 70 to 90 wt.-%, in particular 75 to 85 wt.-%) zeolite,
- (b) 5 to 40 wt.-% (preferably 7 to 25 wt.-%, in particular 10 to 20 wt.-%) clay and
- (c) 2 to 30 wt.-% (preferably 2 to 15 wt.- %, in particular 5 to 10 wt.-%) hygroscopic salt.

The starting mixture optionally contains further conventional additives (d) in an amount of 0 to 5 wt.-%. The proportions of the named components given in "wt.-%" relate to the weight of the starting mixture.

By the term "mixing" is meant a combining of the starting components in any order and optionally a subsequent homogenizing, the respective steps being able to take place at room temperature, but also at increased or reduced temperature.

By "aggregating" is meant here the assembly or shaping of finer particles, e.g. powder particles, which can be achieved by moistening, under pressure or by heating the starting mixture. For the aggregation, methods are used which are known in the technology of particulate solid forms, e.g. granulation, extrusion, pelletizing, compression-agglomeration, grinding or spray-agglomeration. If the desiccant according to the invention is provided as granules, the starting mixture is preferably aggregated by granulation using granulation liquid (wet granulation). The term "granulation" covers the work steps of mixing the starting components and granule formation (granule build-up). For the granulation, for example, mixers, kneader-mixers, extruders or pelletizer-pan mixers can be used, the individual components being able to be mixed together in any order. For example, firstly only the powdery starting components are mixed, the granulation liquid added and optionally mixed again. By the term "mixing" is meant here a combining of the starting components (with or without granulation liquid) and optionally a subsequent homogenizing, the respective steps being able to take place at room temperature, but also at increased or reduced temperature. Granule formation can be achieved by moistening (e.g. by spraying), suitably with solvent, solvent mixtures and/or solvent vapours. A solvent or solvent mixture, preferably water, is preferably used for the aggregating or shaping of the starting mixture to be granulated.

The amount of granulation liquid must lie in a specific range in order to obtain granular particles having a specific diameter e.g. in the range from 0.2 to 5 mm, more preferably 0.5 to 2.0 mm, and can be established by a person skilled in the art by a few tests.

The methods used in the above mentioned steps of drying, sieving and activating are known to persons skilled in the art and therefore require no further elaboration. It may still be mentioned that it is possible, with the help of a so-called fluid-bed granulation, to carry out the steps of mixing, granule build-up and drying in one work stage.

With wet granulation, it is even more preferred to use as granulation liquid a solution or suspension of part or all of the hygroscopic salt (component (c)) of the starting mixture in solvent or solvent mixture.

In a particularly preferred embodiment, the desiccant according to the invention is prepared by wet-granulating a starting mixture comprising the components zeolite, clay and optionally further conventional additives using a solvent or suspension of hygroscopic salt in a solvent or solvent mixture, preferably water, and then activating the granules obtained, optionally after drying and/or sieving. The addition of the hygroscopic salt in dissolved or suspended form has the advantage that, compared with the moistening of a starting mixture which already contains hygroscopic salt, it is distributed more homogeneously in the granules and in particular in the pores of the granular particles. An aqueous solution of one or more hygroscopic salt (s) and in particular an aqueous solution of magnesium sulphate is preferably added to the starting mixture as granulation liquid.

The concentration of the one or more hygroscopic salt(s) in the aqueous solution or suspension is in general 10 to 50 wt.-%, preferably 20 to 50 wt.-% and in particular 35 to 45 wt.-% (each relative to the weight of the solution or suspension). Saturated aqueous solutions of one or more hygroscopic salt(s) are even more preferred, it being most preferred to use a saturated aqueous solution of magnesium sulphate as granulation liquid.

Desiccants which can be obtained by the above-described process according to the invention display a water-absorption capacity per volume, improved compared with previously used clay-bound zeolites, of 160 g $H_2O$/l desiccant or greater, more preferably 160 g $H_2O$/l desiccant to 180 g $H_2O$/l desiccant. These quantities can be calculated from the bulk density and the water-absorption capacity which is relative to the weight of the desiccant (for more details see test methods). The water-absorption capacity of the desiccant (relative to the weight of the desiccant) is measured at 10% relative humidity and 25° C. and is in general 18 wt.-% or greater, more preferably 18 to 22 wt.-%. The bulk density of the desiccant is in general 800 g/l or greater, more preferably 800 to 1000 g/l and even more preferably 900 to 1000 g/l and thus lies in the range of highly compressed clay-bound potassium zeolites 3 Å (e.g. molecular sieve MS 594 from Grace Davison). The desiccant according to the invention displays combinations of values for bulk density and water-absorption capacity (relative to the weight of the desiccant) in the ranges quoted in each case from which water-absorption capacities (relative to the volume of the desiccant) of 160 $H_2O$/l or greater, more preferably 160 g $H_2O$/l to 180 $H_2O$/l can be calculated.

The desiccant according to the invention can be used in particular in insulating glass windows, composite windows (double windows), spacers for insulating glass windows or composite windows (e.g. of metal, metal alloys and/or plastic). It can also be packed in bags made e.g. of paper or plastic, and then used in packed form in packages for moisture-sensitive substance's or equipment, say electronic equipment. Furthermore, the desiccant according to the invention is suitable for use in stoppers for tablet tubes in which it protects moisture-sensitive medicaments or active ingredients, or in gas dryers, in particular air dryers. Furthermore, in addition to these fields of use, uses can also be considered generally where moisture is a problem and can lead e.g. to corrosion or storage instabilities.

A major advantage of the desiccant according to the invention is that, because of the improved water-absorption capacity per volume, the life can be increased with a given window quality compared with products from the state of the art. On the other hand, it is sufficient, for the maintenance of an already achieved life or window quality, to still fill spacers e.g. only on two sides or on one side, instead of as previously on four or two sides, which is associated with a reduction in cost during window manufacture.

It is assumed that the described advantageous effects compared with known clay-bound zeolites, namely a higher water adsorption and bulk density, rest on the fact that, with the process according to the invention, the hygroscopic salt is stored between the particles of clay-bound zeolite, e.g. in the pores of the spherical structure of the granules. However, the hygroscopic salt essentially does not fill the micropores of the zeolite, so that its water adsorption is not adversely affected in practice compared with a zeolite which is present in free form. In addition, the storage of the hygroscopic salt, for example in the pores of the spherical granular particles, offers the advantage that it is immobilized therein and consequently does not liquify. On the other hand, granules from hygroscopic salt form lumps or liquefy if the moisture absorption is too high if it is present as a mere physical mixture with zeolite granules.

The following examples illustrate the present invention. If not otherwise indicated, all percentages relate to weight.

EXAMPLE 1

2330 g potassium-containing zeolite of the structure type A and 250 g clay were mixed in an intensive mixer and then 675 g of a saturated aqueous magnesium sulphate solution added as granulation liquid, so that a sufficient granulation moisture was present for sphere formation. The spheres were dried for 24 hours at 120° C., sieved out to a sphere diameter of 1.6 to 2 mm and activated for 2 hours at 500° C. After activation, the granules had a water-absorption capacity (measured at 10% r.h. and 25° C.) of 21 wt.-% (relative to the weight of the desiccant) and a bulk density of 838 g/l. This produced a water-absorption capacity per volume of 176 g $H_2O$/l desiccant.

COMPARATIVE EXAMPLES

The desiccant according to the invention prepared in Example 1 was compared with previously used desiccants conventional in the trade based on clay- or water-glass bound zeolite with regard to water-absorption capacity (in wt.-%, measured at 10% r.h. and 25° C.), bulk density (in g/l) and water-absorption capacity per volume (in g $H_2O$/l desiccant). These results are summarized in Table 1.

TABLE I

| No. | Product Type | Commercial product | Water-absorption capacity at 10% r.h. and 25° C. [wt.-%] | Bulk density | Water-absorption capacity per volume [g $H_2O$/l desiccant] |
|---|---|---|---|---|---|
| 1 (comparison) | Clay-bound, potassium-containing zeolite of structure type A | PHONO-SORB ® 558 (Grace Davison) | 18.5 | 750 | 139 |
| 2 (comparison) | Clay-bound, potassium-containing zeolite of the structure type A (highly compressed) | Molecular sieve MS 594 (Grace Davison) | 17 | 820 | 139 |
| 3 (comparison) | Water glass-bound sodium zeolite | MS W 558 (Grace Davison) | 21 | 700 | 147 |

TABLE I-continued

| No. | Product Type | Commercial product | Water-absorption capacity at 10% r.h. and 25° C. [wt.-%] | Bulk density | Water-absorption capacity per volume [g H$_2$O/l desiccant] |
|---|---|---|---|---|---|
| Desiccant according to the invention (Ex. 1) | 4 Å with shrunken pores Clay-bound, potassium-containing zeolite of the structure type A containing MgSO$_4$ | — | 21 | 838 | 176 |

It emerges from Table I that the desiccant according to the invention displays a higher or identical water-absorption capacity at 10% r.h. and 25° C. and higher bulk densities than the previously used desiccants based on clay- or water glass-bound zeolite. The combination of these two values produces a higher water-absorption capacity per volume compared with the known products.

Test methods:

1. Measurement of Water-Absorption Capacity (Relative to the Weight of the Desiccant)

5 g activated desiccant was subjected to an air stream of 10% r.h. at 25° C. and 300 l/h. The weight difference through water absorption of the desiccant was measured gravimetrically, until the weight remained constant. Then the water-absorption capacity was measured by means of measurement of loss on ignition at 950° C.

2. Measurement of Bulk Density

A 150-ml vertical cylinder was weighed. Desiccant according to the invention was then poured into this stand cylinder and compressed under vibration so that the fill volume was approx. 100 ml after compression. Weighing was carried out anew, the weight of filled desiccant divided by the fill volume after compression giving the bulk density.

The water-absorption capacity per volume was calculated from the bulk density [g/l] which was multiplied by the water-absorption capacity (relative to the weight of the desiccant)/100.

The invention claimed is:

1. Desiccant clay-bound zeolite, which comprises zeolite, clay and hygroscopic salt, and optionally further additives, wherein the desiccant is in the form of granules and the hygroscopic salt is present in the pores of the granules but does not fill the micropores of the zeolite.

2. Desiccant according to claim 1, wherein the zeolite comprises sodium-containing zeolite of the structure type A, potassium-containing zeolite of the structure type A, zeolite of the faujasite structure type or a mixture thereof.

3. Desiccant according to claim 1, wherein the zeolite comprises potassium-containing zeolite of the structure type A.

4. Desiccant according to claim 2, wherein the potassium-containing zeolite of the structure type A has a potassium content of 9 to 18 wt. % (relative to the weight of the zeolite).

5. Desiccant according to one of claims 1, wherein the clay comprises montmorillonite, kaolinite, bentonite, smectite, attapulgite, sepiolite or a mixture thereof.

6. Desiccant according to one of claims 1, wherein the hygroscopic salt comprises magnesium chloride, calcium chloride, magnesium sulphate, sodium sulphite, magnesium polyphosphate, sodium polyphosphate, sodium carbonate, sodium sulphate or a mixture thereof.

7. Desiccant according to claim 6, wherein the hygroscopic salt is selected from magnesium chloride, magnesium sulphate and magnesium polyphosphate.

8. Desiccant according to claim 7, wherein the hygroscopic salt is magnesium sulphate.

9. Desiccant according to one of claims 1, which comprises 50 to 90 wt. -% zeolite, 5 to 40 wt. -% clay, 2 to 30 wt. -% hygroscopic salt and optionally 0 to 5 wt. % further additives.

10. Desiccant according to one of claim 1, which has a water-absorption capacity (measured at 10% relative humidity and 25° C.) of 18 wt .-% or greater, relative to the weight of the desiccant, a bulk density of 800 g/l or greater, and a water-absorption capacity per volume of 160 g H$_2$O/l desiccant or greater.

11. Process for the preparation of a desiccant according to one of claims 1, wherein a starting mixture comprising the components (a) zeolite, (b) clay, (c) hygroscopic salt and (d) optionally further additives is mixed, aggregated and the product obtained by aggregation is activated, optionally after drying and/or sieving.

12. Process according to claim 11, wherein a starting mixture is aggregated by granulation using granulation liquid (wet granulation).

13. Process according to claim 12, wherein a solvent or solvent mixture is used as granulation liquid.

14. Process according to claim 13, wherein a solvent or suspension of part or all of the hygroscopic salt (component (c)) of the starting mixture in the solvent or solvent mixture is used as granulation liquid.

15. Process according to claim 14, wherein the starting mixture comprising the components zeolite, clay and optionally further additives is wet-granulated using a solution or suspension of hygroscopic salt in a solvent or solvent mixture and then the granules obtained are activated, optionally after the drying and/or sieving.

16. Process according to claim 15, wherein an aqueous solution of one or more hygroscopic salt(s) is used as granulation liquid.

17. Process according to claim 16, characterized in that the aqueous solution of one or more hygroscopic salt(s) has a concentration of 10 to 50 wt.-% (relative to the weight of the solution) and/or comprises a saturated aqueous solution of a one or more hygroscopic salt(s).

18. Process according to claim 17, wherein a saturated aqueous magnesium sulphate solution is used as granulation liquid.

19. Insulating glass window or composite window, which comprises desiccant according to one of claims 1.

20. Spacer for insulating glass windows or composite windows, which comprises desiccant according to one of claims 1.

21. Desiccant according to claim 1, which has a water-absorption capacity (measured at 10% relative humidity and 25° C. of 18 wt. -% to 22 wt. -%, (relative to the weight of the desiccant), a bulk density of 800 to 1000 g/l, and a water-absorption capacity per volume of 160 to 180 g H$_2$O desiccant.

22. Desiccant clay-bound zeolite, which comprises zeolite, clay and hygroscopic salt, and optionally further additives, wherein said desiccant possesses a water absorption capacity (measured at 10% relative humidity and 25° C.) of 18 wt % or greater based on the weight of the desiccant.

23. A mixture comprising zeolite, clay and hygroscopic salt, and optionally further additives, wherein said hygroscopic salt is in solution or suspension.

* * * * *